United States Patent
Ladd et al.

(10) Patent No.: US 6,417,278 B1
(45) Date of Patent: Jul. 9, 2002

(54) LOW COMPRESSION, RESILIENT GOLF BALLS INCLUDING A CIS-TO-TRANS CATALYST AND METHOD FOR MAKING SAME

(75) Inventors: Derek A. Ladd, Vista, CA (US); Laurent Bissonnette, Portsmouth, RI (US); David A. Bulpett, Boston; Mark N. Wrigley, New Bedford, both of MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/575,238

(22) Filed: May 22, 2000

Related U.S. Application Data (63) Continuation-in-part of application No. 09/461,736, filed on Dec. 16, 1999, and a continuation-in-part of application No. 09/461,421, filed on Dec. 16, 1999, and a continuation-in-part of application No. 09/458,676, filed on Dec. 10, 1999, now Pat. No. 6,291,592, and a continuation-in-part of application No. 09/307,753, filed on May 10, 1999, now Pat. No. 6,162,135, and a continuation-in-part of application No. 09/048,348, filed on Mar. 26, 1998, now Pat. No. 6,093,357.

(60) Provisional application No. 60/113,949, filed on Dec. 24, 1998.

(51) Int. Cl.$^7$ ............................ A63B 37/06; C08L 9/00; C08L 51/04

(52) U.S. Cl. ...................... 525/193; 525/236; 525/245; 525/261; 525/274; 473/373; 473/374

(58) Field of Search .............................. 525/193, 245, 525/261, 274, 236; 473/373, 374

(56) References Cited

U.S. PATENT DOCUMENTS

| | | | |
|---|---|---|---|
| 3,239,228 A | 3/1966 | Crompton, III | 273/218 |
| 3,572,721 A | 3/1971 | Harrison et al. | 273/218 |
| 3,572,722 A | 3/1971 | Harrison et al. | 273/218 |
| 3,666,272 A | 5/1972 | Walker et al. | 273/218 |
| 3,804,421 A | 4/1974 | Alex et al. | 273/218 |
| 3,926,933 A | 12/1975 | Naylor | 260/94.3 |
| 3,965,055 A | 6/1976 | Shichman et al. | 260/3 |
| 3,992,900 A | 11/1976 | Retford | 273/218 |
| 4,033,900 A | 7/1977 | Hargis et al. | 252/431 L |
| 4,144,223 A | 3/1979 | Kent | 60/42.47 |
| 4,310,582 A | 1/1982 | Stumpe, Jr. | 428/182 |
| 4,625,964 A | 12/1986 | Yamada | 273/62 |
| 4,650,193 A | 3/1987 | Molitor et al. | 273/228 |
| 4,692,497 A | 9/1987 | Gendreau et al. | 525/263 |
| 4,714,253 A | 12/1987 | Nakahara et al. | 273/228 |
| 4,781,383 A | 11/1988 | Kamada et al. | 273/228 |
| 4,848,770 A | 7/1989 | Shama | 273/228 |
| 4,863,167 A | 9/1989 | Matsuki et al. | 273/62 |
| 4,919,434 A | 4/1990 | Saito | 273/235 R |
| 4,931,376 A | 6/1990 | Ikematsu et al. | 526/164 |
| 4,971,329 A | 11/1990 | Llort et al. | 273/218 |
| 4,979,746 A | 12/1990 | Gentiluomo | 273/220 |
| 4,984,803 A | 1/1991 | Llort et al. | 273/235 R |
| 5,002,281 A | 3/1991 | Nakahara et al. | 273/220 |
| 5,017,636 A | 5/1991 | Hattori et al. | 524/300 |
| 5,025,059 A | 6/1991 | Mouri et al. | 524/495 |
| 5,026,067 A | 6/1991 | Gentiluomo | 273/220 |
| 5,037,104 A | 8/1991 | Watanabe et al. | 273/35 R |
| 5,048,838 A | 9/1991 | Chikaraishi et al. | 273/228 |
| 5,072,944 A | 12/1991 | Nakahara et al. | 273/220 |
| 5,131,662 A | 7/1992 | Pollitt | 273/230 |
| 5,141,233 A | 8/1992 | Yuki et al. | 273/218 |
| 5,150,905 A | 9/1992 | Yuki et al. | 273/218 |
| 5,184,828 A | 2/1993 | Kim et al. | 273/228 |
| 5,252,652 A | 10/1993 | Egashira et al. | 524/392 |

(List continued on next page.)

FOREIGN PATENT DOCUMENTS

| | | |
|---|---|---|
| AU | A-28623/97 | 1/1996 |
| AU | A-16547/97 | 2/1997 |
| AU | A-16548/97 | 2/1997 |
| EP | 0 577 058 A1 | 1/1994 |
| EP | 0 903 357 A1 | 3/1999 |
| GB | 1 168 609 | 10/1969 |
| GB | 1 209 032 | 10/1970 |
| GB | 2 299 518 A | 10/1996 |
| GB | 2 300 574 A | 11/1996 |
| GB | 2 302 035 A | 1/1997 |
| GB | 2 302 037 A | 1/1997 |
| GB | 2 321 021 | 7/1998 |
| JP | 51-49840 | 4/1976 |
| JP | 60-241463 | 11/1985 |
| WO | 99/48567 | * 9/1999 |

*Primary Examiner*—David J. Buttner
(74) *Attorney, Agent, or Firm*—Swidler Berlin Shereff Friedman, LLP (57) ABSTRACT

A low compression, resilient golf ball having a center including a material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction, at least one intermediate layer disposed about the center and including a resilient polymer component and a reinforcing polymer component present in an amount sufficient to provide an uncrosslinked first mixture having a rigidity as determined by a flexural modulus greater than about 3.5 MPa, wherein the center and each intermediate layer together form the core, and a cover being disposed about the core, wherein the golf ball has a diameter of at least about 1.68 inches. In particular, the cis-to-trans catalyst includes an organosulfur compound, a Group VIA component, an inorganic sulfide, or a combination thereof, and the reinforcing polymer includes trans-polyisoprene. The invention also relates to golf balls formed from a conversion between various combinations of polybutadiene, cis-to-trans catalyst, free radical source, and optional filler and/or crosslinking agent, to produce a desired golf ball or golf ball component, such as those that are resilient (fast) and have low compression (soft).

30 Claims, 1 Drawing Sheet

U.S. PATENT DOCUMENTS

| | | | |
|---|---|---|---|
| 5,253,871 A | 10/1993 | Viollaz | 273/228 |
| 5,255,922 A | 10/1993 | Proudfit | 273/235 R |
| 5,314,187 A | 5/1994 | Proudfit | 273/235 R |
| 5,407,998 A | 4/1995 | Horiuchi et al. | 525/133 |
| 5,421,580 A | 6/1995 | Sugimoto et al. | 273/227 |
| 5,439,227 A | 8/1995 | Egashira et al. | 273/228 |
| 5,482,285 A | 1/1996 | Yabuki et al. | 273/228 |
| 5,490,674 A | 2/1996 | Hamada et al. | 273/228 |
| 5,494,958 A | 2/1996 | Freeman et al. | 524/505 |
| 5,553,852 A | 9/1996 | Higuchi et al. | 473/373 |
| 5,556,098 A | 9/1996 | Higuchi et al. | 473/373 |
| 5,574,107 A | 11/1996 | Hiraoka et al. | 525/193 |
| 5,585,440 A | 12/1996 | Yamada et al. | 525/193 |
| 5,587,420 A | 12/1996 | Takizawa et al. | 524/572 |
| 5,589,546 A | 12/1996 | Hiraoka et al. | 525/193 |
| 5,601,502 A | 2/1997 | Hiraoka et al. | 473/373 |
| 5,681,898 A | 10/1997 | Pocklington | 525/193 |
| 5,683,312 A | 11/1997 | Boehm et al. | 473/354 |
| 5,688,191 A | 11/1997 | Cavallaro et al. | 473/373 |
| 5,697,856 A | 12/1997 | Moriyama et al. | 473/374 |
| 5,704,852 A | 1/1998 | Kato et al. | 573/357 |
| 5,716,293 A | 2/1998 | Yabuki et al. | 473/363 |
| 5,728,011 A | 3/1998 | Sugimoto et al. | 473/357 |
| 5,779,561 A | 7/1998 | Sullivan et al. | 473/373 |
| 5,779,562 A | 7/1998 | Melvin et al. | 473/373 |
| 5,803,831 A | 9/1998 | Sullivan et al. | 473/374 |
| 5,816,944 A | 10/1998 | Asakura et al. | 473/372 |
| 5,820,489 A | 10/1998 | Sullivan et al. | 473/377 |
| 5,833,553 A | 11/1998 | Sullivan et al. | 473/374 |
| 5,840,801 A | 11/1998 | Gardiner | 525/54.44 |
| 5,848,943 A | 12/1998 | Sano et al. | 473/365 |
| 5,861,465 A | 1/1999 | Hamada et al. | 525/332.6 |
| 5,873,796 A | 2/1999 | Cavallaro et al. | 473/365 |
| 5,919,101 A | 7/1999 | Yokota et al. | 473/374 |
| 5,929,171 A | 7/1999 | Sano et al. | 525/261 |
| 6,012,997 A | 1/2000 | Mason | 473/594 |
| 6,039,910 A | 3/2000 | Tanaka et al. | 264/248 |
| 6,093,357 A | 7/2000 | Bissonnette et al. | 264/248 |
| 6,120,390 A * | 9/2000 | Dalton | |

* cited by examiner

LOW COMPRESSION, RESILIENT GOLF BALLS INCLUDING A CIS-TO-TRANS CATALYST AND METHOD FOR MAKING SAME

This application is a continuation-in-part of application Ser. No. 09/048,348, filed Mar. 26, 1998, now U.S. Pat. No. 6,093,357, and a continuation-in-part of application Ser. No. 09/307,753, filed May 10, 1999, now U.S. Pat. No. 6,162, 135 filed Dec. 16, 1999, now pending; Ser. No. 09/458,676, filed Dec. 10, 1999, now U.S. Pat. No. 6,291,592; and Ser. No. 09/461,421, filed Dec. 16, 1999, now pending, each of which claims priority to provisional application No. 60/113, 949, filed Dec. 24, 1998. Each of these applications is incorporated herein in its entirety by express reference thereto.

FIELD OF THE INVENTION

The present invention relates to low compression, resilient golf balls and portions thereof formed the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction, at least one intermediate layer disposed about the center and including a resilient polymer component and a reinforcing polymer component present in an amount sufficient to provide an uncrosslinked first mixture having a rigidity as determined by a flexural modulus greater than about 3.5 MPa (508 psi), and a cover being disposed about the core.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally popular with recreational golfers because they are very durable and provide maximum distance. Balls having a two-piece construction are commonly formed of a polymeric core encased by a cover. Typically, the core is formed from polybutadiene that is chemically crosslinked with zinc diacrylate and/or other similar crosslinking agents. These balls are generally easy to manufacture, but are regarded as having limited playing characteristics. Solid golf balls also include multi-layer golf balls that are comprised of a solid core of one or more layers and/or a cover of one or more layers. These balls are regarded as having an extended range of playing characteristics.

Wound golf balls are generally preferred by many players due to their high spin and soft "feel" characteristics. Wound golf balls typically include a solid, hollow, or fluid-filled center, surrounded by a tensioned elastomeric material and a cover. Wound balls generally are more difficult and expensive to manufacture than solid two-piece balls.

A variety of golf balls designed to provide a wide range of playing characteristics, i.e., the compression, velocity, "feel," and spin, that can be optimized for various playing ability, are known in the prior art. One of the most common polymer components present in modem golf ball construction, in addition to ionomers, is polybutadiene and, more specifically, polybutadiene having a high cis-isomer concentration. The use of a polybutadiene having a high cis-concentration results in a very resilient and rigid golf ball, especially when coupled with a hard cover material. These highly resilient golf balls have a relatively hard "feel" when struck by a club. Soft "feel" golf balls constructed with a high cis-polybutadiene have low resilience. In an effort to provide improved golf balls, various other polybutadiene formulations have been prepared, as discussed below.

U.S. Pat. No. 3,239,228 discloses a solid golf ball having a core molded of polybutadiene rubber with a high sulfur content, and a cover. The polybutadiene content of the core is stereo-controlled to the configuration 25–100 percent cis- and 0–65 percent trans-1,4-polybutadiene, with any remainder having a vinyl configuration of polybutadiene. A preferred embodiment of the polybutadiene golf ball core contains 35 percent cis-, 52 percent trans-, and 13 percent vinyl-polybutadiene. The level of trans- and vinyl-content are disclosed to be unimportant to the overall playing characteristics of the polymer blend.

British Patent No. 1,168,609 discloses a molding composition from which improved golf ball cores can be molded and which contains cis-polybutadiene as a basic polymer component. The core polymer component typically includes at least 60 percent cis-polybutadiene, with the remainder being either the trans- or vinyl-forms of polybutadiene. In a preferred embodiment, the core polybutadiene component contains 90 percent cis-configuration, with the remaining 10 percent being either the trans- or vinyl-configurations of 1,4-polybutadiene.

U.S. Pat. Nos. 3,572,721 and 3,572,722 disclose a solid, one- or two-piece golf ball, with the two-piece ball having a core and a cover. The cover material can include any one of a number of materials, or blends thereof, known to those of ordinary skill in the art, including trans-polybutadiene which may be present in an amount from at least 90 percent, with the remainder being the cis- and/or vinyl configuration.

British Patent No. 1,209,032 discloses a two- or three-piece golf ball having a core and a cover. The core or cover material can be any material capable of being crosslinked. In particular, the material can be a polymer or a copolymer of butadiene or isoprene. Preferably, the polymer component is polybutadiene having a cis content of greater than 50 percent by weight.

U.S. Pat. No. 3,992,014 discloses a one-piece, solid golf ball. The golf ball material is typically polybutadiene, with a stereo-configuration selected to be at least 60 percent cis-polybutadiene, with the remaining 40 percent being the trans-polybutadiene and/or 1,2-polybutadiene (vinyl) isomers.

U.S. Pat. No. 4,692,497 discloses a golf ball and material thereof formed by curing a diene polymer including polybutadiene and a metal salt of an alpha, beta ethylenically unsaturated acid using at least two free radical initiators.

U.S. Pat. No. 4,971,329 discloses a solid golfball made from a polybutadiene admixture of cis-1,4 polybutadiene and 1,2 polybutadiene, a metal salt of an unsaturated carboxylic acid, an inorganic filler, and a free radical initiator. The admixture has about 99.5 percent to about 95 percent by weight of cis-1,4 polybutadiene and about 0.5 percent to about 5 percent by weight of 1,2 polybutadiene.

U.S. Pat. No. 5,252,652 discloses a one-piece or multi-layered golf ball core with improved flying performance from a rubber composition comprising a base rubber, preferably 1,4-polybutadiene with a cis-content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis-structure of at least 40 percent, with the remaining 60 percent being the trans-polybutadiene isomer. A preferred embodiment contains a cis-structure of at least 90 percent and more preferably, a cis-structure of at least 95 percent.

U.S. Pat. No. 5,697,856 discloses a solid golf ball having a core and a cover wherein the core is produced by vulcanizing a base rubber composition containing a butadiene rubber having a cis-polybutadiene structure content of not less than 90 percent before vulcanization. The amount of trans-polybutadiene structure present after vulcanization is 10 to 30 percent, as amounts over 30 percent are alleged to detrimentally result in cores that are too soft with deteriorated resilience performance, and to cause a decrease in golf ball performance. The core includes a vulcanizing agent, a filler, an organic peroxide, and an organosulfur compound.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis-content of at least 40 percent by weight, a crosslinking agent, a co-crosslinking agent, an organic sulfide, and a filler. The crosslinking agent is typically an organic peroxide present in an amount from 0.3 to 5.0 parts by weight and the co-crosslinking agent is typically a metal salt of an unsaturated fatty acid present in an amount from 10 to 40 parts by weight. The organic sulfide compound is typically present from 0.05 to 5 parts by weight.

U.S. Pat. No. 5,816,944 discloses a solid golf ball having a core and a cover wherein the core has a JIS-C hardness of 50 to 80 and the cover has a Shore-D hardness of 50 to 60. The core material includes vulcanized rubber, such as cis-polybutadiene, with a crosslinker, an organic peroxide, an organosulfur compound and/or a metal-containing organosulfur compound, and a filler.

U.S. Pat. No. 6,039,910 discloses a golf ball core and method of allegedly reducing the eccentricity of an inner layer to an outer layer by penetrating the inner layer into a part of a seam portion of the outer layer. An unvulcanized material is semivulcanized or vulcanized to form an outer layer half shell whose configuration is generally hemispherical.

Additionally, conventional polymers that have a high percentage of the trans-isomer polybutadiene conformation, such as DIENE 35NF, from Firestone Corp., that has 40 percent cis-isomer and 50 percent trans-isomer polybutadiene, and mixtures of high-cis- and high-trans-isomer content polybutadienes, such as CARIFLEX BR1220, from Shell Corporation, and FUREN 88, from Asahi Chemical Co., respectively, typically do not yield high resilience values and therefore are not desirable.

Manufacturers of quality multi-layer golf balls implement rigorous controls to minimize eccetricity between layers of the balls. When multi-layer golf balls have eccentric layers, the balls tend to spin erratically and flight characteristics are erratic and undesirable.

It is thus desired to prepare golf balls having centers with lower compression, i.e., a softer ball, while having the same or higher resilience than conventional enters. It is alternatively desired to obtain the same or lower compression while achieving greater resilience. Furthermore, it is desired to provide a multi-layer golf ball with substantially concentric layers.

SUMMARY OF THE INVENTION

All of the embodiments according to the invention below may be used in any golf ball. Particularly, each embodiment may be used in one of the following embodiments. In one embodiment, the golf ball includes a core and a cover disposed concentrically about the core and the reaction product, also referred to as the material formed from a conversion reaction, is preferably disposed in at least a portion of the core. In a preferred embodiment, the golf ball includes a core having a center and at least one intermediate layer; and a cover disposed concentrically about the core, wherein the reaction product is preferably disposed in the center.

The invention relates to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trains-isomer greater than the amount of trans-isomer present before the conversion reaction, (2) at least one intermediate layer disposed about the center and including a resilient polymer component and a reinforcing polymer component present in an amount sufficient to provide an uncrosslinked first mixture having a rigidity as determined by a flexural modulus greater than about 3.5 MPa, wherein the center and each intermediate layer together form the core, and (3) a cover being disposed about the core.

In one embodiment, the cover has at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7. In another embodiment, the reaction product has a first dynamic stiffness measured at −50° C. that is less than about 130 percent of a second dynamic stiffness measured at 0° C.

Preferably, the cis-to-trans catalyst includes an organosulfur compound, an inorganic sulfide, a Group VIA component, or a combination thereof. In one preferred embodiment, the organosulfur compound is substantially free of metal and includes at least one of diphenyl disulfide or ditolyl disulfide, or both. In a more preferred embodiment, the organosulfur component includes ditolyl disulfide. The cis-to-trans catalyst is typically present in an amount from about 0.1 to 25 parts per hundred of polybutadiene. In a preferred embodiment, the cis-to-trans catalyst is present in an amount from about 0.1 to 12 parts per hundred of polybutadiene. In a more preferred embodiment, the cis-to-trans catalyst is present in an amount from about 0.1 to 8 parts per hundred of polybutadiene. In another embodiment, the cis-to-trans catalyst is present in an amount sufficient to produce the polybutadiene reaction product so as to contain at least about 32 percent trans-isomer. In another embodiment, the cis-to-trans catalyst further includes at least one of an aromatic organometallic compound, a metal-organosulfur compound, an aromatic organic compound, or a combination thereof.

When elemental sulfur or polymeric sulfur, or both, are included in a Group VIA component in the cis-to-trans catalyst, the reaction product can further include a vulcanization accelerator. In one embodiment, the vulcanization accelerator includes at least one of sulfenamide, thiazole, dithiocarbamate, thiuram, xanthate, thiadiazine, thiourea, guanadine, or aldehyde-amine. The accelerator, when used, is typically present in an amount from about 0.05 to 2 phr. In a preferred embodiment, the optional accelerator is present in an amount from about 0.1 to 1 phr.

In one embodiment, the polybutadiene reaction product includes less than about 7 percent vinyl-isomer content based on the total polybutadiene. In a preferred embodiment, the polybutadiene reaction product includes less than about 4 percent vinyl-isomer. In a more preferred embodiment, the polybutadiene reaction product includes less than about 2 percent vinyl-isomer.

The invention also includes a golf ball wherein the center including the material has a first point having a first hardness and a second point having a second hardness that is at least about 10 percent greater than the first hardness. In one embodiment, the golf ball center has a diameter from about 0.85 inches to 1.4 inches. In another embodiment, the core has a diameter from about 1.5 inches to 1.62 inches, while preferably the core has a diameter from about 1.51 inches to 1.6 inches.

The reaction product material formed from the conversion reaction typically has a first amount of trans-isomer at a first point in the center and a second amount of trans-isomer at a second point in the center, and wherein the first amount of trans-isomer is at least about 6 percent less than the second amount of trans-isomer. In one embodiment, the first amount of trans-isomer is at least about 10 percent less than the second amount of trans-isomer. In another additional or alternative embodiment, the second point has from about 35 percent to 60 percent of trans-isomer polybutadiene. In yet another such embodiment, the second point has from about 40 percent to 50 percent of trans-isomer polybutadiene.

The reinforcing polymer component in an intermediate layer is present in an amount of about 1 to 40 weight percent of the at least one intermediate layer and includes at least one of a block copolymer ether/ester, an acrylic polyol, a trans-polyisoprene, a transisomer polybutadiene, a 1,2-polybutadiene, an ethylene-vinyl acetate copolymer, a polyethylene or copolymer thereof, a trans-polycyclooctenamer, or a combination thereof. In one preferred embodiment, the reinforcing polymer component includes transpolyisoprene. In another preferred embodiment, the reinforcing polymer component includes a polybutadiene polymer with a trans-content greater than 90 percent and a vinyl content of less than 9 percent. In one preferred embodiment, the intermediate layer including the uncrosslinked first mixture has a rigidity as measured by a flexural modulus greater than about 7 MPa (~1,020 psi). All of the intermediate layers together typically have a total thickness of about 0.08 inches to 0.6 inches. In one embodiment, at least one intermediate layer includes a tensioned elastomeric material wound about the center. This tensioned elastomeric material can include the same or a different polybutadiene reaction product as the center.

The cover typically has a thickness of at least about 0.03 inches, preferably from about 0.03 to 0.125 inches, and can have a Shore D hardness of about 58 to 68. In one embodiment, the cover includes at least two layers.

In one preferred embodiment, the invention relates to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction, (2) at least one intermediate layer disposed about the center and including a resilient polymer component and a trans-polyisoprene component present in an amount of at least about 10 percent based on the total polymer content of the intermediate layer, and (3) a cover being disposed about the core. In another preferred embodiment, the trans-polyisoprene component is present in an amount of about 10 percent to 40 percent.

In another preferred embodiment, the invention relates to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction, (2) at least one intermediate layer disposed about the center and including a resilient polymer component and a trans-polybutadiene component present in an amount of at least about 15 percent based on the total polymer content of the intermediate layer, and (3) a cover being disposed about the core. In a preferred embodiment, the trans-polybutadiene component is present in an amount of about 15 percent to 40 percent.

BRIEF DESCRIPTION OF THE DRAWINGS

Further features and advantages of the invention can be ascertained from the following detailed description that is provided in connection with the drawing(s) described below.

DEFINITIONS

The term "about," as used herein in connection with one or more numbers or numerical ranges, should be understood to refer to all such numbers, including all numbers in a range.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising 4n+2π(pi) ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof, halogen; amino, nitro, cyano, and amido; carboxyl including esters, acids, and metal salts thereof; silyl; acrylates and metal salts thereof; and phosphates and phosphites groups. Aryl groups used as part of an organosulfur component herein must contain sulfur.

As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in height.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "coefficient of restitution" for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 μm. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-μm amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

As used herein, the terms "Group VIA component" or "Group VIA element" mean a component that includes a sulfur component, selenium, tellurium, or a combination thereof.

As used herein, the term "loss tangent," or tan δ, is defined as unrecoverable energy divided by recoverable energy, where the energy of deflection is measured at the operating criteria specified herein for dynamic stiffness. The loss tangent was acquired using the same Dynamic Mechanical Analyzer and setting as above.

As used herein, the term "molecular weight" is defined as the absolute weight average molecular weight.

As used herein, the term "multilayer" means at least two layers and includes wound balls and balls with at least two intermediate layers and/or an inner and/or outer cover.

As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, unless otherwise stated, the percent of cis-isomer polybutadiene, reflects the amount of cis-isomer compared to the total number of polybutadiene isomers. The fraction is multiplied by 100 to obtain the percent. The percent of trans-isomer polybutadiene, reflects the amount of trans-isomers compared to the total number of polybutadiene isomers in the composition, with this number being multiplied by 100 to determine the percentage. The percent of vinyl-isomer is similarly defined.

DETAILED DESCRIPTION OF THE INVENTION

The present invention relates to one-piece golf balls and two piece golf balls having a core and a cover, or multilayer golf balls having a solid center, at least one intermediate layer disposed concentrically adjacent to the center, and a cover. At least one of the center, cover, or intermediate layer includes a reaction product that includes a cis-to-trans catalyst, a resilient polymer component having polybutadiene, a free radical source, and optionally, a crosslinking agent, a filler, or both. Preferably, the reaction product has a first dynamic stiffness measured at -50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

Preferably, the polybutadiene reaction product is used to form a portion of the center, at least one intermediate layer, or both. More preferably, the reaction product is used to form the center of the golf ball. At least one intermediate layer is solid and includes a reinforcing polymer component as described herein to improve the centering of the layers within the ball.

The invention also includes a method to convert cis-isomer of a polybutadiene to trans-isomer during a molding cycle and to form a portion of a golf ball. Various combinations of polymers, cis-to-trans catalysts, fillers, crosslinkers, and a source of free radicals may be used to form the reaction product. To obtain a higher resilience and lower compression, a high-molecular weight polybutadiene with a cis-isomer content preferably greater than about 70 percent is converted to increase the percentage of trans-isomer content at any point in the golf ball or portion thereof, preferably to increase the percentage throughout substantially all of the golf ball or portion thereof, during the molding cycle. More preferably, the cis-isomer is present in an amount of greater than about 80 percent of the total polybutadiene content. In one preferred embodiment, the cis-isomer is present in an amount of greater than about 96 percent of the total polybutadiene content. Without wishing to be bound by any particular theory, it is believed that a low amount of 1,2-polybutadiene isomer ("vinyl-polybutadiene") is desired in the initial polybutadiene, and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-isomer polybutadiene backbone is responsible for the lower modulus and higher resilience of the reaction product and golf balls including the same.

To produce a polymer reaction product that exhibits the higher resilience and lower modulus (low compression) properties that are desirable and beneficial to golf ball playing characteristics, high-molecular-weight cis-1,4-polybutadiene, preferably may be converted to the trans-isomer during the molding cycle. The polybutadiene material typically has a molecular weight of greater than about 200,000. Preferably, the polybutadiene molecular weight is greater than about 250,000, more preferably between about 300,000 and 500,000. Without wishing to be bound by any particular theory, it is believed that the cis-to-trans catalyst component, in conjunction with the free radical source, acts to convert a percentage of the polybutadiene polymer component from the cis- to the trans-conformation. The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof.

In one embodiment, the at least one organosulfur component is substantially free of metal, which typically means less than about 10 weight percent metal, preferably less than about 3 weight percent metal, more preferably less than about 1 weight percent metal, and most preferably only trace amounts of metal, such as less than about 0.01 weight percent.

As used herein when referring to the invention, the term "organosulfur compound(s)" or "organosulfur component(s)," refers to any compound containing carbon, hydrogen, and sulfur. Preferably, organosulfur compounds or components includes aromatic organosulfur components, such as aryl compounds. More preferably, organosulfur components suitable for use in the invention include at least one of diphenyl disulfide; 4,4'-ditolyl disulfide; 2,2'-benzamido diphenyl disulfide; bis(2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl) disulfide; bis (2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl) disulfide; bis(2-acetylphenyl) disulfide; bis(4-formylphenyl) disulfide; bis(4carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphtyl) disulfide; 2,2'-bis(1-acetylnaphthyl) disulfide; and the like; or a mixture thereof. Most preferred organosulfur components include diphenyl disulfide, 4,4'-ditolyl disulfide, or a mixture thereof, especially 4,4'-ditolyl disulfide. The organosulfur cis-to-trans catalyst, when present, is preferably present in an amount sufficient to produce the reaction product so as to contain at least about 12 percent trans-isomer at any location, but typically is greater than about 32 percent trans-isomer polybutadiene at any location based on the total resilient polymer component. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. The cis-to-trans catalyst may also be a blend of an organosulfur component and an inorganic sulfide component or a Group VIA component.

The cis-to-trans catalyst can include a Group VIA component, as defined herein. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt of Nonvalk, Conn.

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is preferably present in an amount from about 0.1 to 25 parts per hundred of the total resilient polymer component. More preferably, the cis-to-trans catalyst is present in an amount from about 0.1 to 12 parts per hundred of the total resilient polymer component. Most preferably, the cis-to-trans catalyst is present in an amount from about 0.1 to 8 parts per hundred of the total resilient polymer component. The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component.

The measurement of trans-isomer content of polybutadiene referred to herein was and can be accomplished as follows. Calibration standards are prepared using at least two polybutadiene rubber samples of known trans-content, e.g., high and low percent trans-isomer polybutadiene). These samples are used alone and blended together in such a way as to create a ladder of trans-isomer polybutadiene content of at least about 1.5 percent to 50 percent or to bracket the unknown amount, such that the resulting calibration curve contains at least about 13 equally spaced points.

Using a commercially available Fourier Transform—Infrared (FT-IR) spectrometer equipped with a Photoacoustic (PAS) cell, a PAS spectrum of each standard was obtained using the following instrument parameters: scan at speed of 2.5 KHz (0.16 cm/sec optical velocity), use a 1.2 KHz electronic filter, set an undersampling ratio of 2 (number of laser signal zero crossings before collecting a sample), co-add a minimum of 128 scans at a resolution of 4 cm$^{-1}$ over a range of 375 to 4000 cm$^{-1}$ with a sensitivity setting of 1.

The cis-, trans-, and vinyl-isomer polybutadiene peaks found between 600 and 1100 cm$^{-1}$ from the PAS spectra can be integrated. The area under the trans-isomer polybutadiene peaks as a fraction of the total area under the three isomer peaks can then be determined to construct a calibration curve of the trans-isomer polybutadiene area fraction versus the actual trans-isomer polybutadiene content. The correlation coefficient ($R^2$) of the resulting calibration curve must be a minimum of 0.95.

A PAS spectrum is obtained using the parameters described above for the unknown core material at the point of interest (e.g., the surface or geometric center of the core) by filling the PAS cell with a sample containing a freshly cut, uncontaminated surface free of foreign matters such as mold release and the like. The trans-isomer polybutadiene area fraction of the unknown is analyzed to determine the actual trans-isomer content from the calibration curve. An increase in the trans-content anywhere in the article being manufactured or tested should be understood herein to refer to the trans- at any point in the article.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-isomer polybutadiene). These samples are used alone and blended together in such a way as to create a ladder of trans-isomer content of at least about 1.5 percent to 50 percent or to bracket the unknown amount, such that the resulting calibration curve contains at least about 13 equally spaced points.

Using a Fourier Transform—Raman (FT-Raman) spectrometer equipped with a near-infrared laser, a Stokes Raman spectrum should be obtained from each standard using the following instrument parameters: sufficient laser power to obtain a good signal to noise ratio without causing excessive heating or fluorescence (typically about 400 to 800 mW is suitable); a resolution of 2 cm$^{-1}$; over a Raman shift spectral range of about 400 to 4000 cm$^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 cm$^{-1}$. The correlation coefficient ($R^2$) of the resulting calibration curve must be a minimum of 0.95.

A Raman spectrum of the unknown core material is obtained using this instrument at the point of interest in the unknown sample (e.g., surface or geometric center of the golf ball core). The unknown must be free of foreign matter, such as mold release, etc. Analyze the spectrum of the unknown using the PLS calibration curve to determine trans-isomer content of the unknown sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals.

Crosslinkers are included to increase the hardness of the reaction product. Suitable crosslinking agents include one or more metallic salts of unsaturated fatty acids or monocarboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 40 percent of the polymer component. When an organosulfur is selected as the cis-to-trans catalyst, zinc diacrylate may be selected as the crosslinking agent and is present in an amount of less than about 25 phr.

Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, ground particles of cured rubber, and mixtures thereof. Fillers may also include various foaming agents or blowing agents which may be readily selected by one of ordinary skill in the art. Foamed polymer blends may be formed by blending blowing agent(s) with polymer material, as is well known by those of ordinary skill in the art. Polymeric, ceramic, metal, or glass microspheres, or combinations thereof may be used to adjust the density or other properties of a given layer, and such microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The resilient polymer component, additional polymers, free-radical initiator, filler(s), and any other materials used in forming either the golf ball center or any portion of the core, in accordance with invention, may be combined to form a mixture by any type of mixing known to one of ordinary skill in the art. In one preferred embodiment, this resilient polymer component is used to form the center. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 93° C. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 171° C. for a duration of 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 143° C. for 40 minutes, then ramping the mold to 171° C. where it is held for a duration of 20 minutes. In a preferred embodiment of the current invention, a single-step cure cycle is employed. Single-step processes are effective and efficient, reducing the time and cost of a two-step process. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured polymer component in the center, which contains a greater amount of trans-isomer polybutadiene than the uncured polymer component, is formed into the center and has a first hardness at a first point, such as near the geometric center of the golf ball center, and has a second hardness at a second point, for example at the exterior surface of the center, such that the second hardness is at least about 10 percent greater than the first hardness. In another embodiment, the second hardness is at least about 20 percent greater than the first hardness. The cured center also typically has a first amount of trans-isomer polybutadiene at a first, interior point and a second amount of trans-isomer polybutadiene at a second point located closer to the surface of the golf ball center, wherein the first amount is at least about 6 percent less than the second amount, preferably at least about 10 percent less than the second amount, and more preferably at least about 20 percent less than the second amount. The interior location is preferably the geometric center of the golf ball center.

It should be understood by those of ordinary skill in the art that the polybutadiene reaction product can be blended with at least a second polymer component to form the center of the golf ball. In one preferred embodiment, the polybutadiene reaction product can be used to form the center and a second, different polymer component will be combined with a reinforcing polymer component to form at least one intermediate layer. This last embodiment is discussed in greater detail below.

The at least one intermediate layer for use in a ball core includes a resilient polymer component, which is preferably used as the majority of polymer in the intermediate layer. Resilient polymers suitable for use in the ball core include polybutadiene, polyisoprene, styrene-butadiene, styrene-propylene-diene rubber, ethylene-propylene-diene (EPDM), mixtures thereof, and the like. The resilient polymer component is preferably a conventional cis-polyisoprene or a polybutadiene ("BR") component, more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn. The conventional cis-polybutadiene or other resilient polymer component, when used to form an intermediate layer, may be produced with any suitable catalyst that results in a predominantly 1,4-cis content, and preferably with a catalyst that provides a high 1,4-cis content and a high molecular weight average. The resilient polymer component has a high molecular weight average, defined as being at least about 50,000 to 1,000,000, preferably from about to 750,000, and more preferably from about 200,000 to 400,000. CARIFLEX BR 1220 has a molecular weight average of about 372,000. The 1,4-cis component of polybutadiene is generally the predominant portion of the resilient polymer component when polybutadiene is present. "Predominant" or "predominantly" is used herein to mean greater than 50 weight percent. The 1,4-cis component is preferably greater than about 90 weight percent, and more preferably greater than about 95 weight percent, of the polybutadiene component. The resilient polymer component is typically present in an amount of at least about 60 weight percent, preferably about 65 to 99 weight percent, and more preferably about 75 to 90 weight percent of the polymer blend. The term "polymer blend," when referring to the intermediate layer, is generally used herein to mean the blend of the resilient polymer component and the reinforcing polymer component. The resilient polymer component imparts resilience to the core or mantle in the cured, or crosslinked, state.

The intermediate layer, or mantle, is also preferably prepared by including a reinforcing polymer component, which contains at least one polymer having a glass transition temperature sufficiently low to permit combination and mixing of the reinforcing polymer component with the resilient polymer component without initiating crosslinking of the crosslinking agent that is also typically present in the mixture, as described herein. The reinforcing polymer component should have a sufficiently low viscosity at the mixing temperature when mixed with the resilient polymer component to permit proper mixing of the two polymer components, i.e., the resilient polymer component and the reinforcing polymer component.

The reinforcing polymer component also typically has a glass transition temperature (and if crystalline, a crystalline melting point) sufficiently low to permit mixing with the resilient polymer component while avoiding substantial crosslinking or thermal degradation of the resilient component at the mixing temperature. The crystalline melting temperature is typically between about 35° C. to 120° C. Examples of polymers suitable for use in the reinforcing polymer component include: trans-polyisoprene, block copolymer ether/ester, acrylic polyol, a polyethylene, a polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Talmadge, Ohio. Some suitable reinforcing polymer components are listed below with their crystalline melting points and/or $T_g$.

| Polymer Type | Tradename | Crystalline Melt Temperature (° C.) | $T_g$ (° C.) |
| --- | --- | --- | --- |
| Trans-polyisoprene | KURRARAY TP251 | 60 | −59 |
| Trans-polybutadiene | FUREN 88 | 84 | −88 |
| Polyethylene | Dow LPDE | 98 | −25 |
| Trans-polycyclo octenenamer | VESTENAMER 8012 | 54 | −65 |

Another polymer particularly suitable for use in the reinforcing polymer component is a rigidifying polybutadiene component, which typically includes at least about 80 percent trans-isomer content with the rest being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the conventional cis-isomer polybutadienes or polybutadienes having a low trans-isomer content, i.e., typically below 80 percent, which are often used in forming golf ball cores and often used in the resilient polymer components discussed herein. Typically, the vinyl-content of the rigidifying polybutadiene component is present in no more than about 15 percent, preferably less than about 10 percent, more preferably less than about 5 percent, and most preferably less than about 3 percent of the polybutadiene isomers, with decreasing amounts being preferred. Without being bound by theory, it is believed that decreasing the vinylpolybutadiene content increases resilience of the polymer and the material formed therewith.

The rigidifying polybutadiene component, when used in the invention, also has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

The rigidifying polybutadiene component, when used in the invention, typically has a high absolute molecular weight average, defined as being at least about 100,000, preferably from about 200,000 to 1,000,000. In one embodiment, the absolute molecular weight average is from about 230,000 to 750,000 and in another embodiment it is from about 275,000 to 700,000. In any embodiment where the vinyl-content is present in greater than about 10 percent, the absolute molecular weight average is preferably greater than about 200,000.

When included in the at least one intermediate layer as part or all of the reinforcing polymer component, the rigidifying polybutadiene component of the invention may be produced by any means available to those of ordinary skill in the art, preferably with a catalyst that results in a rigidifying polybutadiene having at least 80 percent trans-content and a high absolute molecular weight average. A variety of literature is available to guide one of ordinary skill in the art in preparing suitable polybutadiene components for use in the invention, including U.S. Pat. Nos. 3,896,102; 3,926,933; 4,020,007; 4,020,008; 4,020,115; 4,931,376; and 6,018,007, each of which is hereby incorporated herein by express reference thereto.

Unless another rigidifying method is used, the reinforcing polymer component should be present in an amount sufficient to impart rigidity to the shells during processing, yet not undesirably reduce resilience of the crosslinked polymer blend and thereby have an undesirable effect on the final product. Also, the reinforcing polymer component, i.e., the additive polymer component, must have a viscosity sufficiently low to permit mixing of the reinforcing polymer component and the resilient polymer component. For example, trans-polyisoprene is the preferred reinforcing polymer component and has a viscosity of less than 1,000,000 poise at a mixing temperature of around 82° C. The viscosity of materials suitable for use in the invention may be readily determined by one of ordinary skill in the art. The viscosity should generally be below about 1,000,000 poise to readily permit mixing. When trans-polyisoprene or high trans-isomer polybutadiene is included in the reinforcing polymer component, it is typically present in an amount of about 10 to 40 weight percent, preferably about 15 to 30 weight percent, more preferably about 15 to no more than 25 weight percent of the polymer blend, i.e., the resilient and reinforcing polymer components. The weight of the reinforcing polymer relative to the total composition for forming the intermediate layer generally ranges from about 5 to 25 weight percent, preferably about 10 to 20 weight percent. The uncrosslinked mantle layer should have a flexural modulus, as measured under ASTM D790M-93, Method II, of greater than about 3.5 MPa, and preferably greater than about 7 MPa. The reinforcing polymer component(s) imparts a degree of rigidity to the shells sufficient to maintain the desired shape until the first mixture is crosslinked.

The desired elastic modulus for the mantle may be obtained by adjusting the amount of crosslinking by selecting a particular type or amount of crosslinking agent. This may be achieved, for example, by altering the type and amount of crosslinking agent, which method is well known to those of ordinary skill in the art. The same crosslinking agents mentioned above may be used in this embodiment for preparing the intermediate layer, although for the intermediate layer the crosslinking agent is typically added in an amount from about 1 to 50 parts per hundred of the polymer blend, preferably about 20 to 45 parts per hundred, and more preferably about 30 to 40 parts per hundred, of the polymer blend.

The resilient polymer component, reinforcing polymer component, free-radical initiator, and any other materials used in forming an intermediate layer of a golf ball core in accordance with invention may be combined by any type of mixing known to one of ordinary skill in the art. A suitable system, for example, would include trans-polyisoprene, which melts at around 60° C., as the reinforcing component and a dicumyl peroxide, which substantially initiates reaction at around 170° C., as the free radical initiator. Suitable types of mixing include single pass and multi-pass mixing, and the like. The optional crosslinking agent, and any other optional additives used to modify the characteristics of the golf ball center, may similarly be combined by any type of mixing. A single-pass mixing process where ingredients are added sequentially is preferred, as this type of mixing tends to increase efficiency and reduce costs for the process. Suitable mixing equipment is well known to those of ordinary skill in the art, and such equipment may include a Banbury mixer or a twin screw extruder. Conventional mixing speeds for combining polymers are typically used, although the speed must be high enough to impart substantially uniform dispersion of the resilient and reinforcing polymer components. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the resilient polymer component. Also, too high a mixing speed may undesirably result in creation of enough heat to initiate the crosslinking before the preforms are shaped and assembled around a core. The mixing temperature depends upon the type of resilient and reinforcing polymer components, and more importantly, on the type of free-radical initiator. The mixing temperature must be higher than the melting temperature of the reinforcing polymer component, but not so high as to initiate substantial crosslinking. For example, when using di(2-t-butyl-peroxyisopropyl)benzene peroxide as the free-radical initiator, a mixing temperature of about 80° C. to 125° C., preferably about 88° C. to 110° C., and more preferably about 90° C. to 100° C. is suitable to safely mix the ingredients. The mixing speed and temperature are readily determinable by one of ordinary skill in the art without undue experimentation.

In this preferred embodiment, the preforms can then be prepared by mixing the resilient polymer component, the reinforcing polymer component, and any other ingredients together as discussed above. The resulting geometrical stability provides additional time for processing between preform formation and curing via compression molding. This additional time may be used to improve manufacturability, optimize production scheduling, and the like, such as by preparation and stockpiling of rigid shells to facilitate molding machine shut down for maintenance or tool changes. With enough shells stockpiled, further golf ball manufacture could be carried out even while the preform injection machine is being retooled. The mixture of polymer components, free-radical initiator, optionally a crosslinking agent, and any fillers may be extruded or pelletized for introduction into a molding machine for preparation of the mantle.

The half-shells, which are typically hemispherical or ellipsoidal in shape, are preferably injection molded from the mixture based on cost and speed considerations, although compression or other types of molding could also be suitable. The mold is preferably maintained at a temperature below the crystalline melting temperature of the reinforced polymer component to inhibit the formed shells from altering shape due to the memory of the resilient polymer component.

After their formation, the half-shells are assembled about the center to form the core. In accordance with the invention, the shells may be produced rapidly, for example, with injection molding. The rapid production of shells permits use of automated procedures for assembly about the center. During assembly about the center, the half-shells, particularly when ellipsoidally shaped, may self-orient themselves vertically when placed in hemispherical mold cups, which reduces preparation time, cost, and defects. The ellipsoidal-shaped half-shells inhibit formation of air cavities at the apex due to their having more material at the crown of the shell, thereby facilitating the expulsion of any trapped air out of the mold at the equator of the core where the two mold halves are typically combined for the molding of the mantle about the center. The assembly of the core, i.e., typically two half-shell preforms and a center, may be compression molded. When the mold halves are combined, they form a rigid, spherical cavity. Once the mold is closed, the excess material from the shell crowns is forced out of the mold cavity at the equator where the mold halves combine. The compression molding of the assembled preforms and center tends to take about 5 to 40 minutes, although times may vary depending upon the materials used. For example, a typical compression molding cycle may take 12 minutes at around 174° C. The shells are forced together by the mold and substantially cured during molding. Optionally, if additional mantle layers are desired, e.g., having different characteristics to improve or modify the overall ball qualities, they may be provided over the first mantle layer. Additional mantle layers are preferably added after the previous mantle layer is cured, although they may be added before cure of the previous layer if the pre-cured mantle layer is rigid enough so that substantially no mixing of the layers occurs. Balls prepared according to the invention with a reinforcing polymer component in the mantle tend to exhibit substantially the same resilience, or coefficient of restitution, as balls with conventional mantles.

The polymer compositions of the present invention may be used in golf balls having a diameter of about 1.5 to 1.8 inches, preferably from about 1.6 to 1.8 inches, and more preferably from about 1.68 to 1.74 inches. Preferably, the ball will comply with the USGA rules of golf.

The hardness differences discussed herein are generally meant to refer to the golf ball center, which contains the reaction product.

The core typically has an outer diameter that ranges from about 1.5 inches to about 1.62 inches, preferably from about 1.51 inches to 1.6 inches. The center is preferably solid and is typically a solid sphere. The cured portion of the center has a first amount of trans-isomer polybutadiene at an interior location and a second amount of trans-isomer polybutadiene at an exterior surface location, e.g., the outer edge of a center or an intermediate layer, wherein the first amount is at least about 6 percent less than the second amount, preferably at least about 10 percent less than the second amount, and more preferably at least about 20 percent less than the second amount. Also, the center has a first point, typically near the geometric center of the golf ball center, with a first hardness, and a second point, typically near the surface of the golf ball center, with a second hardness, such that the second hardness is at least about 10 percent greater than the first hardness. In other embodiments, the second hardness is at least about 20 percent greater or at least about 30 percent greater, than the first hardness.

The core typically includes a center portion and at least one intermediate layer, wherein the intermediate layer, alternatively called a mantle layer, is disposed about the center portion. The center portion has an outer diameter that typically ranges from about 0.75 inches to 1.50 inches, preferably from about 0.85 inches to 1.4 inches, and more preferably from about 1.0 inches to 1.25 inches.

Whether the golf ball core has a single intermediate layer or a plurality of intermediate layers disposed about the center portion, the layers have a cumulative thickness typically from about 0.08 inches to 0.6 inches, for example, from about 0.25 inches to 0.3 inches thickness. These intermediate layers may each be solid or wound, but in one embodiment each intermediate layer is preferably solid. In one embodiment, the intermediate layers have little or no hardness gradient, such that the hardness at one point of a given intermediate layer will be less than 10 percent different than the hardness at another point in the same intermediate layer.

In yet another embodiment of this invention, an intermediate layer of at least one tensioned elastomeric thread material is wound about the center or another intermediate layer. In one preferred embodiment, the thread material incorporates the reaction product of the invention.

In one embodiment, the reaction product contains about 45 percent trans-isomer polybutadiene at the outside surface of a center portion. For example, an embodiment of the invention may contain between about 35 percent to 60 percent of the trans-isomer at the outside surface of a center portion. Another embodiment has from about 40 percent to 50 percent of trans-isomer at the outside surface of a center portion. In various embodiments, the reaction product at the center of the solid center portion can contain at least about 20 percent less trans-isomer, at least about 30 percent less trans-isomer, or at least about 40 percent less trans-isomer, than is present at the outside surface of the same center portion.

In another embodiment, there is a first point in the interior of the center and a second point closer to the surface of the center portion. The second point can have from about 35 percent to 60 percent of trans-isomer polybutadiene, and in various embodiments the amount of trans-isomer polybutadiene at the first point is no more than about 80 percent, no more than about 70 percent, or no more than about 60 percent, of the amount of trans-isomer polybutadiene at the second point.

The difference in the hardness between two points on a center portion or on an intermediate layer can be expressed as a gradient. If the hardness measured at one point differs from the hardness measured at another point, the article, either a center portion or an intermediate layer, can be said to contain a hardness gradient. For example, a composition of this invention shaped into a portion of a golf ball may have a Shore C hardness at one point of about 45 to 60 and a hardness at a second point of about 65 to 75. In one golf ball formulated according to the invention, the Shore C hardness was 51 at one point in the core and 71 at a second point, providing a hardness difference of greater than 20 percent.

One of ordinary skill in the art can, in light of this disclosure, readily prepare a core with a plurality of solid intermediate layers disposed about a center portion, wherein no single layer has two points where the hardness differs by more than 10 percent, but cumulatively the hardness differs by more than about 10 percent across a plurality of the layers. For example, a core including a two-layer center portion manufactured with a composition of this invention with a hardness gradient of 10 percent across the entire golf ball center, would be within the scope of the invention. The gradients between successive layers may, but need not, overlap.

The compression of the core, or portion of the core, of golf balls prepared according to the invention is typically below about 75, preferably below about 50, more preferably below about 25.

In another embodiment, multiple cover layers are disposed about a core to form a golf ball. In this embodiment of the invention, the golf ball typically has two cover layers, a first cover layer (inner layer) being exterior to and contacting the core, and a second cover layer (outer layer) disposed about the first cover layer. In this embodiment, the core typically has an outer diameter that ranges from about 1.4 inches to 1.62 inches, typically from about 1.45 inches to about 1.55 inches. When a cover having two layers is used, the ball preferably is formed with a core having a center and at least one intermediate layer.

The cover provides the interface between the ball and a club. Properties that are desirable for the cover are good moldability, high abrasion resistance, high tear strength, high resilience, and good mold release, among others. The cover typically has a thickness to provide sufficient strength, good performance characteristics and durability. The cover of the golf balls typically has a thickness of at least about 0.03 inches, preferably 0.03 to 0.125 inches, and more preferably from about 0.05 to 0.1 inches. In one embodiment of the invention the cover is 0.05 inches in thickness and has a Shore D hardness of about 58 to 68, with an exemplary Shore D hardness being about 62. The golf balls also typically have at least about 60 percent dimple coverage, preferably at least about 70 percent dimple coverage, of the surface area of the cover.

The cover can include any suitable cover or intermediate layer materials, known to those of ordinary skill in the art, including thermoplastic and thermosetting materials, but preferably the cover or intermediate layer can include any suitable materials, such as ionic copolymers of ethylene and an unsaturated monocarboxylic acid which are available under the trademark SURLYN of E.I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin polymer having from 2 to 8 carbon atoms as a repeating unit and an unsaturated mono- or di-carboxylic acid having 3 to 8 carbon atoms as a repeating unit. The carboxylic acid groups of the copolymer may be totally or partially neutralized and might include methacrylic, crotonic, maleic, fumaric or itaconic acid.

This golf ball can likewise include one or more homopolymeric or copolymeric cover materials, such as:
(1) Vinyl resins, such as those formed by the polymerization of vinyl chloride, or by the copolymerization of vinyl chloride with vinyl acetate, acrylic esters or vinylidene chloride;
(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;
(3) Polyurethanes, such as those prepared from polyols or amines and diisocyanates or polyisocyanates and those disclosed in U.S. Pat. No. 5,334,673;
(4) Polyureas, such as those disclosed in U.S. Pat. No. 5,484,870;
(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;
(6) Acrylic resins and blends of these resins with poly vinyl chloride, elastomers, and the like;
(6) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;
(8) Polyphenylene oxide resins or blends of polyphenylene oxide with high impact polystyrene as sold under the trademark NORYL by General Electric Company of Pittsfield, Mass.;
(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;
(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and
(11) Blends of thermoplastic rubbers with polyethylene, propylene, polyacetal, nylon, polyesters, cellulose esters, and the like.

Preferably, the cover includes polymers, such as ethylene, propylene, 1-butene or 1-hexane based homopolymers or copolymers including functional monomers, such as acrylic and methacrylic acid or fully or partially neutralized ionomer resins, and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly (ethylene terephthalate), poly(butylene terephthalate), poly (ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

The cover may also be formed from the present invention, as discussed herein.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golfball performance.

Depending on the desired properties, balls prepared according to the invention can exhibit substantially the same or higher resilience, or coefficient of restitution (CoR), with a decrease in compression or modulus, compared to balls of conventional construction. Additionally, balls prepared according to the invention can also exhibit substantially higher resilience, or coefficient of restitution (CoR), without an increase in compression, compared to balls of conventional construction. Another measure of this resilience is the "loss tangent," or tan δ, which is obtained when measuring the dynamic mechanical properties of an object. Loss tangent and terminology relating to such dynamic properties is typically described according to ASTM D4092-90. Loss tangent and a variety of other dynamic properties may be measured according to ASTM D4065-90, and terminology relating to such dynamic properties is typically described according to ASTM D4092-90. Low loss tangent indicates higher rebound capacity, since most of the energy imparted to a golf ball from the club is converted to dynamic energy, i.e., launch velocity and resulting longer distance. Low loss tangent indicates that most of the energy imparted to a golf ball from the club is converted to dynamic energy, i.e., launch velocity and resulting longer distance. The desired loss tangent in the crosslinked mantle material should be less than about 0.15 at −60° C. and less than about 0.05 at 30° C. when measured at a frequency of 1 Hz and a one percent strain.

The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling exact measurement of loss tangent at discrete points within a sample article. In the case of this invention, the article is a golf ball core. The polybutadiene reaction product in the center preferably has a loss tangent below about 0.1 at −50° C., and more preferably below about 0.07 at −50° C.

The resultant golf balls typically have a coefficient of restitution of greater than about 0.7, preferably greater than about 0.75, and more preferably greater than about 0.8. The golf balls also typically have an Atti compression (which has been referred to as PGA compression in the past) of at least about 40, preferably from about 50 to 120, and more preferably from about 60 to 100. Compression values are dependent on the diameter of the article being measured. The golf ball cover material of the present invention typically has a flexural modulus of from about 1000 psi to 300,000 psi, preferably from about 2000 to 200,000 psi. The golf ball polybutadiene material in the center typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material.

Additionally, the unvulcanized rubber, such as polybutadiene, in golf balls prepared according to the invention typically has a Mooney viscosity greater than about 20, preferably greater than about 30, and more preferably greater than about 40. Mooney viscosity is typically measured according to ASTM D-1646.

When golf balls are prepared according to the invention, they typically will have dimple coverage greater than about 60 percent, preferably greater than about 65 percent, and more preferably greater than about 70 percent. The flexural modulus of the cover material on the golf balls, as measured by ASTM method D-790M, is typically greater than about 500 psi, and is preferably from about 2,000 psi to 200,000 psi. The hardness of the cover is typically from about 35 to 80 Shore D, preferably from about 40 to 78 Shore D, and more preferably from about 45 to 75 Shore D.

Figure 1:
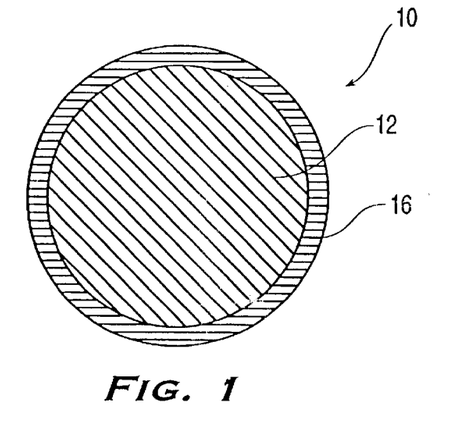
FIG. 1 is a cross-sectional view of a two-piece golf ball having a cover and a core according to the invention.
Figure 2:
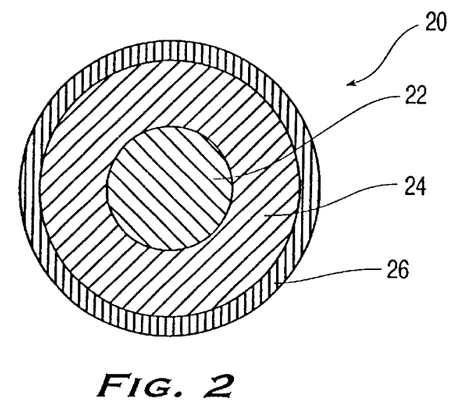
FIG. 2 is a cross-section of a golf ball having an intermediate layer between a cover and a center according to the invention.
Figure 3:
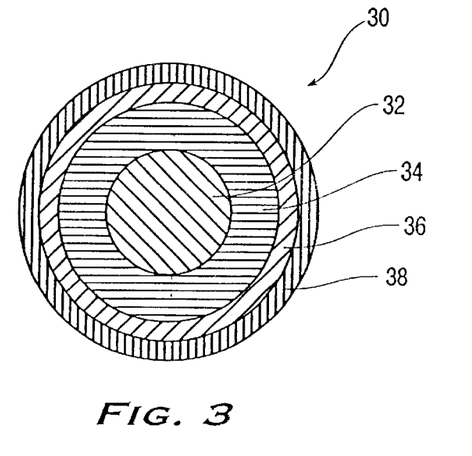
FIG. 3 is a cross-section of a golf ball having more than one intermediate layer between a cover and a center according to the invention.

Referring to FIG. 1, a golf ball 10 of the present invention can include a core 12 and a cover 16 surrounding the core 12. Referring to FIG. 2, a golf ball 20 of the present invention can include a center 22, a cover 26, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

EXAMPLES

The following examples are illustrative of the invention:

Example 1

Cores Prepared from According to the Invention, Employing Various Cis-to-trans Catalysts A variety of metal sulfide cis-to-trans catalysts that successfully converted a portion of the cis-isomer polybutadiene isomer to the trans-isomer are presented in Table 1. CARIFLEX BR-1220 polybutadiene (100 phr) was reacted with zinc oxide (5 phr), dicumyl peroxide (3 phr, the free radical initiator), zinc diacrylate (25 phr), and cis-to-trans to form the reaction product as described in the present invention.

Trans-isomer conversion percentages range from below 6 percent to above 16 percent for the various catalysts that are present in amounts ranging from below 2 phr to above 5 phr. The table clearly demonstrates the effectiveness of numerous different cis-to-trans catalysts, at varying concentrations, for increasing the trans-isomer polybutadiene content.

Example 2

Comparison of a Conventional Dual Core Ball to Dual Core Ball Prepared According to the Invention A dual core golf ball according to the present invention was created having a solid center, an intermediate layer surrounding the solid center, and a cover disposed concentrically around the intermediate layer. The components and physical characteristics are presented in Table 2.

A solid center was constructed for the ball of the present invention and for a ball of conventional technology. The centers were both created from CARIFLEX BR1220 polybutadiene as the starting material, the only difference being replacing the VAROX 802-40KE-HP peroxide (conventional technology) with a ditolyl disulfide cis-to-trans catalyst of the current invention and dicumyl peroxide. This substitution allows a portion of the polybutadiene material to be converted to the trans-configuration during the molding process. The resulting solid centers had outside diameters of approximately 1.15 inches. The polybutadiene reaction product prepared thereby had a trans-isomer content of 40 percent compared to the 1.5 percent trans-isomer of the conventional ball. Identical intermediate layers, having outside diameters of approximately 1.58 inches, were constructed around each solid center to form a core.

The compression and CoR values were measured for the two cores. The compression of the core prepared according to the current invention was measured to be 77 and the compression of the core of the conventional ball was measured to be 78. The CoR value of the conventional center was measured to be 0.774, whereas the CoR value of the core of the present invention was measured to be 0.789. Therefore, the present invention resulted in a center and a core having a higher resilience at similar compression compared to a center constructed with conventional technology.

An identical cover was added to both centers and the compression and CoR were measured again. The compression for both balls was measured to be 89, yet the CoR values were 0.791 and 0.802 for the conventional ball and the ball of the present invention, respectively. The present invention resulted in a ball having the same compression with a higher resilience (CoR) compared to a ball constructed with conventional technology.

TABLE 1

Metal Sulfide Conversion Examples

| Polybutadiene (CARIFLEX 1220) | 100 | 100 | 100 | 100 | 100 | 100 | 100 | 100 | 100 | 100 | 100 | 100 | 100 |
|---|---|---|---|---|---|---|---|---|---|---|---|---|---|
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

TABLE 2

Example 2: Dual Core

| | Conventional | Example |
|---|---|---|
| Center 1.15" Diameter | | |
| Shell 1220 | 100 | 100 |
| ZDA | 20 | 20 |
| Varox 802-40KE-HP | 0.89 | 0 |
| Dicumyl Peroxide | 0 | 2.5 |
| Zinc Oxide | 40 | 39 |
| Ditolyl disulfide | 0 | 0.75 |
| % Trans | | |
| Precure | 1.5 | 1.5 |
| Postcure | 1.5 | 40 |
| Load in lbs Required 10.8% Deflection | 85 | 109 |
| Mantle 1.58" Diameter | | |
| Shell 1220 | 80 | 80 |
| ZDA | 38 | 38 |
| Varox 231 XL | 0.42 | 0.42 |
| DBDB-60 | 0.15 | 0.15 |

TABLE 2-continued

Example 2: Dual Core

|  | Conventional | Example |
|---|---|---|
| Zinc Oxide | 6 | 6 |
| Trans-Polyisoprene | 20 | 20 |
| Dual Core Properties 1.58" Diameter | | |
| Compresion | 78 | 77 |
| CoR | 0.774 | 0.789 |
| Cover Material | | |
| Na VLMI | 30 | 30 |
| Na SURLYN | 30 | 30 |
| Li SURLYN | 40 | 40 |
| Shore D | 63 | 63 |
| Ball Properties | | |
| Compression | 89 | 89 |
| CoR | 0.791 | 0.802 |
| Driver Spin | 2800 | 2850 |

Examples 3–6

Comparison of Conventional Golf Balls With Those Prepared According to the Invention Golf balls made from polybutadiene reaction product according to the invention, i.e., Examples 5 and 6, were prepared. Golf balls representative of the prior art, Examples 3 and 4, were also obtained. The composition of the reactants and the properties of these golf balls are compared in Table 3.

These constituents were mixed and molded, thereby converting a percentage of cis- to a trans-conformation, in a solid sphere sized like the core of a golf ball. The compression and coefficient were measured for these cores, each having a 1.58 inch diameter. Examples 5 and 6 illustrate the significant conversion of cis-isomer polybutadiene to trans-isomer polybutadiene when a sulfur cis-to-trans catalyst is present according to the invention compared to the lack of conversion in Examples 3 and 4 when no sulfur catalyst is present. Moreover, Examples 5 and 6 illustrate the improved coefficient of restitution with no significant change in compression that can be achieved with golf balls including the reaction product according to the invention.

TABLE 3

| REACTION PRODUCT | Example 3 (Prior Art) | Example 4 (Prior Art) | Example 5 | Example 6 |
|---|---|---|---|---|
| polybutadiene rubber (CARIFLEX BR1220) | 100 phr | 100 phr | 100 phr | 100 phr |
| Zinc Oxide (ZnO) | 26.6 phr | 2.67 phr | 26.6 phr | 26.6 phr |
| Barium Sulfate (BaSO$_4$) | — | 31 phr | — | — |
| zinc diacrylate | 20 phr | 22.3 phr | 20 phr | 20 phr |
| dicumyl peroxide | 2 phr | — | 2 phr | 2 phr |
| VAROX 802 40KE-HP[a] | — | 0.89 phr | — | — |
| Polymeric sulfur | 0 phr | 0 phr | 0.25 phr | 0 phr |
| Elemental sulfur | 0 phr | 0 phr | 0 phr | 0.25 phr |
| Pre-cure trans-polybutadiene content | 1.5% | 1.5% | 1.5% | 1.5% |
| GOLF BALL CORE | | | | |
| Post-cure trans-polybutadiene content in reaction product | 1.5% | 1.5% | 12% | 12% |
| Atti Compression | 53 | 23 | 26 | 21 |
| Coeff. of Restitution ("CoR") | N/A[b] | 0.72 | 0.77 | 0.76 |

[a]A di-(2-t-butylisopropylperoxy)-benzene peroxide commercially available from RT Vanderbilt of Norwalk, CT.
[b]The core of Example 7 was sufficiently rigid to crack during testing of the coefficient of restitution, indicating an undesirably low CoR.

Examples 7–9

Comparison of Center Portions of a Conventional Golf Ball With Those Prepared According to the Invention Polybutadiene reaction products according to the invention were prepared according to the recipes in Table 4. It can be seen in Table 4 that the coefficient of restitution of the center is higher for each of Examples 8 and 9 manufactured in accordance with this invention than for prior art Example 7. A large portion of the difference in the coefficient of restitution between the center of the prior art to the centers of this invention is maintained to the finished ball, providing the ball with improved characteristics. The coefficient of restitution is higher than that measured on the control ball, Example 7, whether the compression was above or equal to that of the control ball.

Examples 1–11

Properties of a Dual Core Conversion Golf Ball Prepared According to the Invention A dual core ball was manufactured from a composition including effective amounts of an organosulfur catalyst including ditolyl disulfide. The starting material also contained 1,4-cis-isomer polybutadiene, of which greater than 98 percent was cis-isomer polybutadiene.

After the conversion reaction, the prior art ball of Example 10 had the same amount of trans-polybutadiene as before the procedure, since no cis-to-trans catalyst was present. The composition of Example 16 contained over 24 percent trans-isomer polybutadiene. The Shore C hardness range ranged from 51 to 71, with a Shore C difference of greater than 20 percent, between the center of the core and the surface of the core. The difference in the coefficient of restitution in the center, 0.723 for the prior art versus 0.750 for the center manufactured according to the invention, was partially carried through to the finished ball. The properties of this improved ball prepared in accordance with the invention are set forth in Table 4.

The cover for each example was made of 30 parts SURLYN 8320; 40 parts SURLYN 7940; 30 parts SURLYN 7930; with an additional 5 parts color concentrate based on the weight of the three SURLYN components.

The balls of examples 10–11 have virtually the same compression, although the ball prepared according to the invention has a surprisingly improved, and statistically significant, coefficient of restitution compared to the prior art ball.

TABLE 4

| Example No. | 7 Prior Art | 8 | 9 | 10 Prior Art | 11 |
|---|---|---|---|---|---|
| CENTER MATERIALS | | | | | |
| polybutadiene rubber[1] | 100 phr | 100 phr | 100 phr | 25.1 phr | 25.1 phr |
| UBEPOL 130 B[2] | — | — | — | 62.4 | 62.4 |
| ENICHEM NEOCIS BR40[3] | — | — | — | 12.5 | 12.5 |
| zinc diacrylate | 22.5 | 20 | 23 | 22.5 | 22.5 |
| POLYWATE 325[4] | — | — | — | 35 | 35 |
| Zinc oxide | — | — | — | 5.3 | 5.3 |
| VAROX 802-40KE-HP[5] | 0.9 | — | — | 0.9 | — |
| ditolyl disulfide | — | 0.625 | 0.625 | — | 0.63 |
| Coloring | — | — | — | 0.1 | 0.1 |
| EF (DCP)-70[6] | — | 2 | 2 | — | 2 |
| CENTER PROPERTIES (1.13 in. diam.) | | | | | |
| Coeff. of Restitution (CoR) | 0.727 | 0.751 | 0.756 | 0.723 | 0.750 |
| MANTLE MATERIALS | | | | | |
| 1,4-cis-polybutadiene[1,2] | 80 | 80 | 80 | 80 | 80 |
| trans-polyisoprene[7] | 20 | 20 | 20 | 20 | 20 |
| Zinc diacrylate | 38 | 38 | 38 | 38 | 38 |
| Zinc oxide | 5.6 | 5.6 | 5.6 | 5.6 | 5.6 |
| VAROX 231 XL[5] | 0.42 | 0.42 | 0.42 | 0.42 | 0.42 |
| EF (DCP)-70[6] | 0.15 | 0.15 | 0.15 | 0.15 | 0.15 |
| Coloring agent | 0.42 | 0.42 | 0.42 | 0.42 | 0.42 |
| CORE PROPERTIES (1.58 in. diam.) | | | | | |
| Diameter (inches) | 1.581 | 1.582 | 1.582 | 1.580 | 1.580 |
| Shore C Compression | 74 | 71 | 79 | 74 | 72 |
| CoR of the Core | 0.775 | 0.791 | 0.794 | 0.768 | 0.781 |
| BALL PROPERTIES | | | | | |
| Compression | 88 | 85 | 88 | 89 | 90 |
| CoR of the Ball | 0.785 | 0.805 | 0.804 | 0.788 | 0.797 |

[1]from CARIFLEX BR 1220, from H. MUEHLSTEIN & CO., INC., Norwalk, CT.
[2]polybutadiene rubber from UBE INDUSTRIES, LTD., New York, NY.
[3]polybutadiene rubber from ENICHEM ELASTOMERS, INC, New York, NY.
[4]from CIMBAR PERFORMANCE MINERALS, Cartersville, GA.
[5]organic peroxide from R. T. VANDERBILT, Norwalk, CT.
[6]organic peroxide from ELASTOCHEM, INC., Chardon, OH.
[7]KURARY TP251, from KURARAY Co., Ltd. of Tokyo, Japan.

Examples 12–14

Uncrosslinked Mantle Materials According to the Invention

A flex bar specimen having the dimensions 3/16"×1/2"×4" was produced by compression molding uncrosslinked mantle material of Cariflex BR-1220 polybutadiene rubber with trans-polyisoprene according to the invention. The flexural modulus of uncrosslinked mantles prepared according to the invention was measured using ASTM Method D790M-93, Method II, with a loading rate of 0.5 in/min.

| Example # | Reinforcing Component Amount* | Flexural Modulus (MPa) |
|---|---|---|
| 12 | 13.1% | 7.6 |
| 13 | 19.8% | 13 |
| 14 | 26.6% | 21.5 |

*The Reinforcing Polymer Component Amount is a percentage based on the total weight of the resilient and reinforcing polymer components.

Sufficient reinforcing polymer component was present in these examples to form a flex bar for testing and to help reduce or prevent eccentricity during processing and in the resultant golf balls prepared according to the invention.

Examples 15–17

Improved Centering According to the Invention

Three types of golf balls were tested after cure to determine the degree of accuracy in concentricity. Measured values included the average shift, maximum shift, and minimum shift, of the mantle from the midpoint of the ball. The standard deviation ("STD") also calculated.

| Example # | Avg. Shift (inches) | STD | Max Shift (inches) | Min. Shift (inches) |
|---|---|---|---|---|
| 15 (Conventional) | 0.035 | 0.023 | 0.125 | 0.009 |
| 16 | 0.014 | 0.011 | 0.052 | 0.001 |
| 17 | 0.015 | 0.02 | 0.065 | 0.001 |

Example 15 was a competitor's core prepared with conventional materials, which resulted in a typically off-center ball. Examples 16–17 were prepared using the materials and methods invention, and clearly resulted in a highly improved concentricity.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:
1. A golf ball comprising:
   a center comprising a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction;
   at least one intermediate layer disposed about the center and comprising a resilient polymer component and a reinforcing polymer component present in an amount sufficient to provide an uncrosslinked first mixture having a rigidity as determined by a flexural modulus greater than about 3.5 MPa, wherein the center and each intermediate layer together form the core; and
   a cover being disposed about the core.

2. The golf ball of claim 1, wherein the cover has at least one of a dimple coverage of greater than about 60 percent, a hardness from about 35 to 80 Shore D, or a cover material flexural modulus of greater than about 500 psi, and wherein the golf ball has at least one of a compression from about 50 to 120 or a coefficient of restitution of greater than about 0.7.

3. The golf ball of claim 1 wherein the cis-to-trans catalyst comprises an organosulfur compound, an inorganic sulfide, a Group VIA component, or a combination thereof.

4. The golf ball of claim 3 wherein the cis-to-trans catalyst includes the organosulfur compound which comprises ditolyl disulfide.

5. The golf ball of claim 1, wherein the center including the material has a first point having a first hardness and a second point having a second hardness that is at least about 10 percent greater than the first hardness.

6. The golf ball of claim 1 wherein the center has a diameter from about 0.85 inches to 1.4 inches.

7. The golf ball of claim 1, wherein the core has a diameter from about 1.5 inches to 1.62 inches.

8. The golf ball of claim 1 wherein the core has a diameter from about 1.51 inches to 1.6 inches.

9. The golf ball of claim 1 wherein the reaction product material formed from the conversion reaction has a first amount of trans-isomer at a first point in the center and a second amount of trans-isomer at a second point in the center, and wherein the first amount of trans-isomer is at least about 6 percent less than the second amount of trans-isomer.

10. The golf ball of claim 9 wherein the first amount of trans-isomer is at least about 10 percent less than the second amount of trans-isomer.

11. The golf ball of claim 9 wherein the second point has from about 35 percent to 60 percent of trans-isomer polybutadiene.

12. The golf ball of claim 11 wherein the second point has from about 40 percent to 50 percent of trans-isomer polybutadiene.

13. The golf ball of claim 1, wherein the reinforcing polymer component is present in an amount of about 1 to 40 weight percent of the at least one intermediate layer and comprises at least one of a block copolymer ether/ester, an acrylic polyol, a transpolyisoprene, a trans-polybutadiene, a 1,2-polybutadiene, an ethylene-vinyl acetate copolymer, a polyethylene or copolymer thereof, a trans-polycyclooctenamer, or a combination thereof.

14. The golf ball of claim 1 wherein the at least one intermediate layer has a rigidity as measured by a flexural modulus greater than about 7 MPa.

15. The golf ball of claim 1 wherein all of the intermediate layers together have a total thickness of about 0.08 inches to 0.6 inches.

16. The golf ball of claim 1 wherein at least one intermediate layer comprises a tensioned elastomeric material wound about the center.

17. The golf ball of claim 16, wherein the tensioned elastomeric material comprises the reaction product material.

18. The golf ball of claim 1 wherein the cover has a thickness of at least about 0.03 inches.

19. The golf ball of claim 1 wherein the cover has a thickness of about 0.03 to 0.125 inches.

20. The golf ball of claim 1 wherein the cover has a Shore D hardness of about 58 to 68.

21. The golf ball of claim 1 wherein the cover comprises at least two layers.

22. A golf ball comprising:
a center comprising a reaction product material formed from the conversion reaction of sufficient amounts of polybutadiene, a free radical source, and a cis-to-trans catalyst comprising an organosulfur compound to convert a portion of cis-isomer to trans-isomer isomer in the polybutadiene, which reaction occurs at a sufficient temperature to form the material that contains trans-isomer and cis-isomer, wherein said material has an amount of trans-isomer greater than the amount of trans-isomer present before the conversion reaction,
at least one intermediate layer disposed about the center and comprising a resilient polymer component and a reinforcing polymer component present in an amount sufficient to provide an uncrosslinked first mixture having a rigidity as determined by a flexural modulus greater than about 7 MPa, wherein the center and each intermediate layer together form the core; and
a cover being disposed about the core.

23. The golf ball of claim 22, wherein the organosulfur component comprises ditolyl disulfide.

24. The golf ball of claim 22, wherein the reinforcing polymer component comprises trans-polyisoprene.

25. A golf ball comprising:
a center comprising a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction;
at least one intermediate layer disposed about the center and comprising a resilient polymer component and a trans-polyisoprene component present in an amount of at least about 10 percent based on the total polymer content of the intermediate layer; and
a cover being disposed about the core.

26. The golf ball of claim 25, wherein the trans-polyisoprene component is present in an amount of about 10 percent to 40 percent.

27. A golf ball comprising:
a center comprising a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction;
at least one intermediate layer disposed about the center and comprising a resilient polymer component and a trans-polybutadiene component present in an amount of at least about 15 percent based on the total polymer content of the intermediate layer; and
a cover being disposed about the core.

28. The golf ball of claim 27, wherein the trans-polybutadiene component is present in an amount of about 15 percent to 40 percent.

29. The golf ball of claim 1, wherein the center has a diameter from about 1.45 inches to 1.55 inches.

30. The golf ball of claim 21, wherein the at least two layers comprise an outermost layer formed of polyurethane.

* * * * *